April 12, 1932. J. WEISS 1,853,647
AIRCRAFT
Filed Feb. 3, 1931
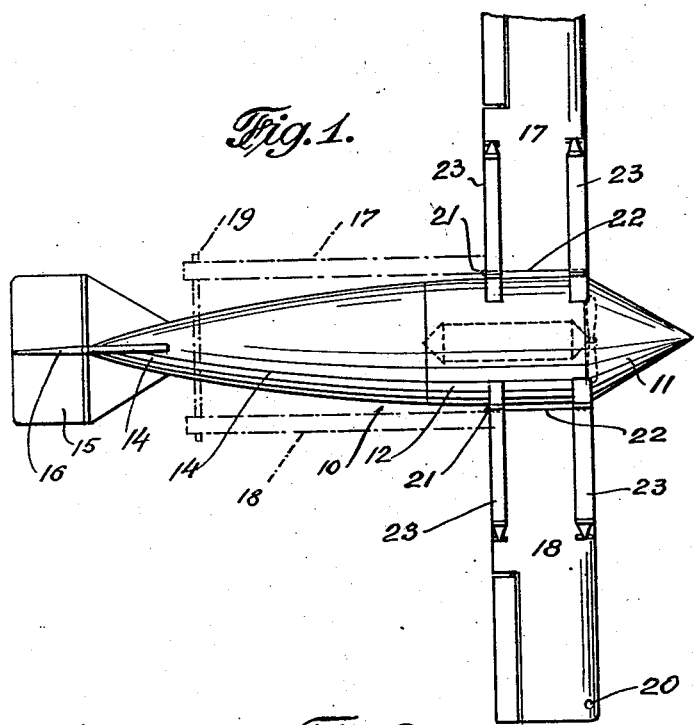
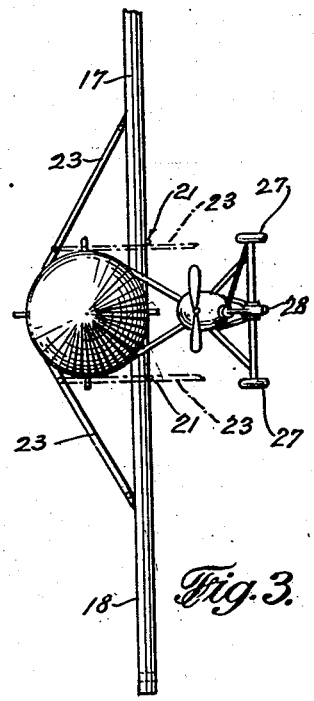
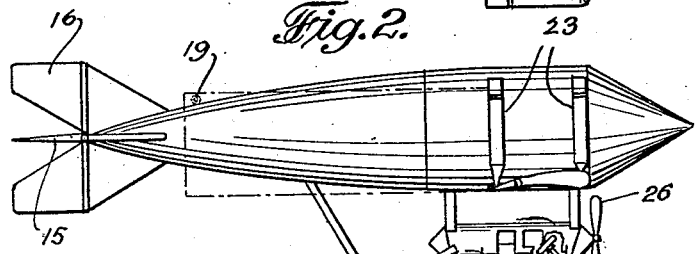
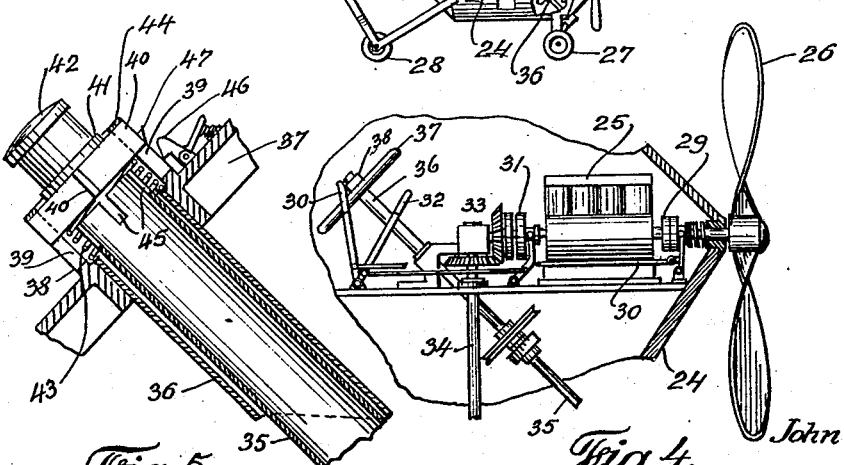
INVENTOR
John Weiss.
BY
ATTORNEY Patented Apr. 12, 1932

1,853,647

UNITED STATES PATENT OFFICE

JOHN WEISS, OF NEW YORK, N. Y.

AIRCRAFT

Application filed February 3, 1931. Serial No. 513,102.

The present invention relates to air craft in general, and particularly to the type known as gliders.

One of the prime objects of my invention is to provide a device of this kind, which will not only be safe, but also inexpensive to produce and economical in operation.

Another object of my invention is to provide an aircraft of this kind, which may be either flown or propelled on land, and which will, when thus propelled or stored, occupy a minimum space.

Another object of my invention is to provide an aircraft of the glider type composed of a rigid, lighter-than-air body equipped with foldable wings and wing supporting struts, which may be secured to the side of the body when the glider is not in use.

Still another object of my invention is to provide a fuselage, cabin or gondola in connection with such aircraft, which is spaced therefrom, yet rigidly connected therewith, and which is not only adapted to house the pilot and passengers, but which serves also to accommodate an auxiliary power plant designed for propelling and steering the craft either in air or on land, and which is intended particularly for supplementing the lifting properties of the craft body, thereby facilitating the glider to reach quickly a stratum at which propelling power is no longer required.

The foregoing and still other objects of my invention will become more fully apparent from the following description and the accompanying drawings, forming part of my disclosure, but by no means intended to limit same to the actual showing, and in which—

Fig. 1 is a plan view of an aircraft of my construction,

Fig. 2 is a side elevation thereof,

Fig. 3 is a front elevation of my device,

Fig. 4 is a partial, enlarged detail view of the auxiliary propelling mechanism of the aircraft, and Fig. 5 is an enlarged partial cross-sectional detail view of the upper steering control wheel portion of my device.

Referring to the figures, numeral 10 denotes a rigid substantially cigar-shaped, lighter-than-air body, having a pointed front portion 11, a substantially cylindrical middle portion 12 and a gradually reducing end 13 terminating in a pointed end portion 14. The latter is provided with control surfaces or rudders 15 and 16.

Secured below and at the forward end of cylindrical portion 12 are wings 17 and 18, which are so arranged as to facilitate their folding up alongside the body, as indicated at Figs. 1 and 2 in broken lines, in which folded position they are held by means of a bar 19 adapted to pass through apertures 20 provided in the wing corners and resting upon the frame work of the tail end of body portion 13.

In order to permit the folding of the wings, they are doubly hinged at 21, and their front or leading edges are suitably held together at their separating line indicated at 22. Both wings are supported and braced by struts 23, when in flight position. These struts are also foldable, as shown in broken lines in Fig. 3 and depend from the cylindrical body portion when not in use.

Underneath the wings and spaced from, but rigidly attached to cylindrical portion 12, a gondola or fuselage 24 is provided, which not only serves for accommodating passengers and pilot, but which is designed to contain an auxiliary power unit. Such power unit may be hand operated (not shown) or may comprise a relatively small engine indicated at 25 in Fig. 4, adapted to operate either a propeller 26 or the landing wheels 27 of the aircraft, or both.

As will be observed from Figs. 2 and 3, the glider is equipped with a pair of front landing wheels 27 and a rear wheel 28. The front wheels are so arranged that they may be driven from motor 25 and also steered from the gondola, in the manner of an automobile. For this purpose engine 25 is provided at its front shaft end with a coupling device 29, operable either by foot pedals or a hand lever, the latter indicated at 30 in Fig. 4, and another coupling device 31 controlled by a suitable arrangement 32.

Coupling 29 serves for connecting propeller 26 with or disconnecting it from engine 25, while coupling 31 serves for the same purpose in respect to power transmission 33 and the engine. Shaft 34 of the transmission is operatively connected with front landing wheels 27 thereby enabling the craft to travel on land. The front wheels are also adapted to be steered by means of steering control shaft 35, extending from steering post 36, which latter is connected with and controls the rudders of the craft.

Post 36 is equipped with a hand wheel 37, the hub of which is provided with an extension 38 projecting upwards. This extension is hollow and possesses a number of slots 39 adapted to receive ribs 40 of a cross member 41, having an operating button 42 which is depressible. A coil spring 43 keeps the cross member in its upward position and a ring 44 secured to the hub extension 38 prevents the cross member from leaving the latter.

Within post 36 is lodged wheel steering shaft 35 provided at its upper end with slots 45 adapted to receive ribs 40 when cross member 41 is pressed downwards. In order to prevent the cross member from disengaging slots 45, a spring controlled detent 46 engages a tooth 47, forming part of one of the ribs. By releasing the detent the cross member is freed. The above described arrangement serves for connecting steering wheel 37 to shaft 35 when it is desired to operate and steer the wheels.

Operation

The craft is primarily intended for gliding operations. The buoyancy of the body is intended to equalize and even lift the weight of the loaded craft, and the motor, either power driven or operated manually, is designed to operate the propeller for the purpose of elevating the craft to an air stratum at which the wings will support the craft in flight.

It is obvious, therefore, that the propeller is not intended as a driving force and consequently the power of the motor need not be great and its size and weight can be insignificant, compared with present-day aircraft engines. Furthermore, the operator of my craft is not dependent upon the motor for lift and flight, once the glider reaches the proper height. In descending, the glider cannot crash, since its buoyant body slows down any fall.

The body being rigid facilitates handling of the craft in similar way as an airplane, particularly when landing. In addition to the above advantages, my device may become a land vehicle and can be driven and steered like an automobile, when its wings are folded to the sides of the body. The land driving provisions facilitate also in taking off from the ground.

In the drawings I have illustrated one of the many possible ways my device may be constructed, and it is obvious that the described design may be altered and improved to meet various conditions for which it may be intended. Thus my device may be developed into an amphibian craft capable of not only flying and rolling on land, but also floating in water. Be it therefore understood that I reserve for myself the right to make such changes or improvements within the broad scope of my idea, as set forth in the annexed claims.

I claim:

1. A glider, comprising a rigid, lighter-than-air body having a pointed front portion, a substantially cylindrical middle portion and a gradually decreasing end portion, the latter provided with horizontal and vertical control planes, a pair of foldable wings secured to and disposed below said middle portion, a gondola spaced from, but rigidly secured to the latter and disposed below the wings, an auxiliary driving mechanism provided with said gondola and comprising means for facilitating propelling the craft either in air or on land, steering controls disposed within said gondola and adapted to facilitate guiding the craft either in air or on land.

2. A glider, comprising in combination, a rigid lighter-than-air body provided with a pair of wings, the latter adapted to be folded alongside the body when not in use, foldable struts secured to said body and adapted to connect with said wings when the latter are in operative position, a gondola spaced from, but rigidly connected with and disposed below said body, an auxiliary power plant provided in said gondola, a propeller in cooperative connection with said plant, landing wheels secured to and disposed below said gondola and in cooperative connection with said power plant, means provided with the latter for facilitating driving either the propeller or said wheels, a glider steering control provided in said gondola and adapted to to facilitate steering the glider either in air or on land.

3. In combination with an aircraft of the class described, of a gondola, an auxiliary power plant and steering controls housed therein, a propeller and landing wheels operatively associated with said power plant, means provided with the latter for causing the operation of either the propeller, or the wheels or both, said means comprising hand controlled coupling devices, said steering controls comprising a steering post adapted to be connected with and to operate aircraft control planes, and provided with manually operable provision for facilitating making connection with said landing wheels for the purpose of steering the latter.

4. An aircraft, comprising in combination, a rigid, lighter-than-air auxiliary body, a pair of wings associated therewith and adapted to be foldable alongside the body, when not in use, in such a way that their outer ends are swung to the rear, a gondola spaced from, but rigidly connected with and disposed below said body and said wings, when the latter are in their normal, operative position, and means provided with said gondola for propelling and steering the craft either in air or on land.

5. An aircraft, comprising in combination, a rigid, lighter-than-air auxiliary body, a pair of wings associated therewith and adapted to be foldable alongside the body, when not in use, in such a way that their outer ends are swung to the rear, a gondola spaced from, but rigidly connected with and disposed below said body and said wings, when the latter are in their normal, operative position, and means provided with said gondola for propelling and steering the craft either in air or on land, said auxiliary body adapted to support a portion of the load of the aircraft for the purpose of equalizing or partially lifting its weight, until its wings are able to support the craft.

In testimony whereof I affix my signature.

JOHN WEISS.